United States Patent
Yu et al.

(10) Patent No.: US 12,219,898 B2
(45) Date of Patent: Feb. 11, 2025

(54) VIRTUAL SENSOR FOR GRAIN LOSS IN COMBINE HARVESTER

(71) Applicant: Deere & Company, Moline, IL (US)

(72) Inventors: Wentao Yu, Bettendorf, IA (US); Volker Fuchs, Saarburg (DE); William D. Todd, Bettendorf, IA (US)

(73) Assignee: Deere & Company, Moline, IL (US)

( * ) Notice: Subject to any disclaimer, the term of this patent is extended or adjusted under 35 U.S.C. 154(b) by 1260 days.

(21) Appl. No.: 16/427,861

(22) Filed: May 31, 2019

(65) Prior Publication Data

US 2020/0375104 A1    Dec. 3, 2020

(51) Int. Cl.
| | |
|---|---|
| *A01D 41/127* | (2006.01) |
| *G06N 3/04* | (2023.01) |
| *A01F 12/44* | (2006.01) |
| *G06N 3/08* | (2023.01) |

(52) U.S. Cl.
CPC .......... *A01D 41/1273* (2013.01); *G06N 3/04* (2013.01); *A01F 12/44* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 5,586,033 A | * | 12/1996 | Hall | A01D 41/127 706/904 |
| 6,553,300 B2 | | 4/2003 | Ma et al. | |
| 7,308,326 B2 | | 12/2007 | Maertens et al. | |
| 2003/0060245 A1 | * | 3/2003 | Coers | A01D 41/127 460/2 |
| 2008/0201054 A1 | * | 8/2008 | Grichnik | F02D 41/1401 703/2 |
| 2009/0063087 A1 | * | 3/2009 | Grichnik | G05B 17/02 702/127 |
| 2009/0292996 A1 | * | 11/2009 | Anne | G05B 19/0428 715/736 |
| 2009/0295561 A1 | * | 12/2009 | Hu | G05B 19/41875 340/501 |
| 2013/0024013 A1 | * | 1/2013 | Mullin | G05B 19/0428 700/28 |
| 2014/0135082 A1 | | 5/2014 | Batcheller et al. | |

(Continued)

FOREIGN PATENT DOCUMENTS

GB    2400692 A  * 10/2004 ......... G06F 17/5009

OTHER PUBLICATIONS

S Hiregoudar. Artificial Neural Network for Assessment of Grain losses for Paddy Combine Harvester a Novel Approach. 2011 [provided by applicant in IDS dated 2019] (Year: 2011).*

(Continued)

*Primary Examiner* — Bion A Shelden

(57) ABSTRACT

Systems and methods are described for a virtual sensor that determines an amount of grain loss during operation of a combine harvester without any direct measurement of grain loss. An electronic controller is configured to determine values for a set of operating conditions including a plurality of sensor values and actuator settings. The electronic controller then applies an artificial neural network that is configure to receive as inputs the values for the set of operating conditions and to produce as an output a value indicative of an estimate amount of grain loss.

15 Claims, 6 Drawing Sheets

(56) References Cited

U.S. PATENT DOCUMENTS

| | | | |
|---|---|---|---|
| 2014/0277960 A1* | 9/2014 | Blank | A01D 41/127 701/50 |
| 2014/0277961 A1* | 9/2014 | Blank | G05B 13/0275 701/1 |
| 2016/0286720 A1 | 10/2016 | Heitmann et al. | |
| 2017/0231156 A1 | 8/2017 | Aesaert et al. | |
| 2017/0273240 A1 | 9/2017 | Quincke | |
| 2019/0162855 A1* | 5/2019 | McPeek | A01D 41/127 |
| 2020/0379962 A1* | 12/2020 | Yamato | G06F 16/907 |

OTHER PUBLICATIONS

Mahmoudi et al., "Minimizing combine harvester rear losses by intelligent modeling of MOG1 passing concave," 2012, Elixir Agriculture, 52:11397-11401.

Hiregoudar et al., "Artificial Neural Network for Assessment of Grain Losses for Paddy Combine Harvester a Novel Approach," 2011, ICLICC, 221-231.

Abdollahpor et al., "Artificial Neural Network prediction model for material threshing in combine harvester," 2012, Elixir Agriculture, 52:11621-11626.

Craessaerts et al., "Identification of the cleaning process on combine harvesters. Part I: A fuzzy model for prediction of the material other than grain (MOG) content in the grain bin," 2008, Biosystems Engineering 101, 42-49.

Hershbarger, "Development and modeling of a slope insensitive combine cleaning shoe," 2008, Iowa State University, Retrospective Theses and Dissertations.

Peyman et al., "Artificial neural network modeling (ANNs) for combine harvester header losses," 2013, Intl. J. Agri. Crop Sci., 5(5):553-558.

European Search Report issued in counterpart application No. 20176987.4 dated Oct. 2, 2020 (09 pages).

S.H. Pishgar Komleh et al: "Predicting the relationship between grain-combine travel, cylinder speed and harvesting losses by applying artificial neural networks", International Journal of Applied Science and Engineering Research, Jun. 20, 2012, pp. 405-414, DOI: 10.6088/ijaser.0020101041.

* cited by examiner

VIRTUAL SENSOR FOR GRAIN LOSS IN COMBINE HARVESTER

BACKGROUND

The present invention relates to systems and methods for operating a combine harvester. In particular, the present invention relates to monitoring grain loss during the operation of a combine harvester.

SUMMARY

In one embodiment, the invention provides a system configured to apply a virtual sensor to determine an amount of grain loss during operation of a combine harvester. An electronic controller is configured to apply actuator settings to each of a plurality of actuators to control the operation of the combine harvester and to receive output signals from each sensor of a plurality of sensors, wherein the output signal from each sensor is indicative of a different operating condition of the combine harvester. The electronic processor determines values for a set of operating parameters and then applies an artificial neural network that is configured to receive as inputs the values for the set of operating parameters and to produce as an output a value indicative of an estimated amount of grain loss. The set of operating parameters received as input by the artificial neural network does not include any direct measurement of grain loss.

In another embodiment, the invention provides a method of determining an amount of grain loss during operation of a combine harvester. An electronic processor determines values for a set of operating parameters that does not include any direct measurement of grain loss. The electronic processor then applies an artificial neural network that is configured to receive as inputs the values for the set of operating parameters and to produce as an output a value indicative of an estimated amount of grain loss.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
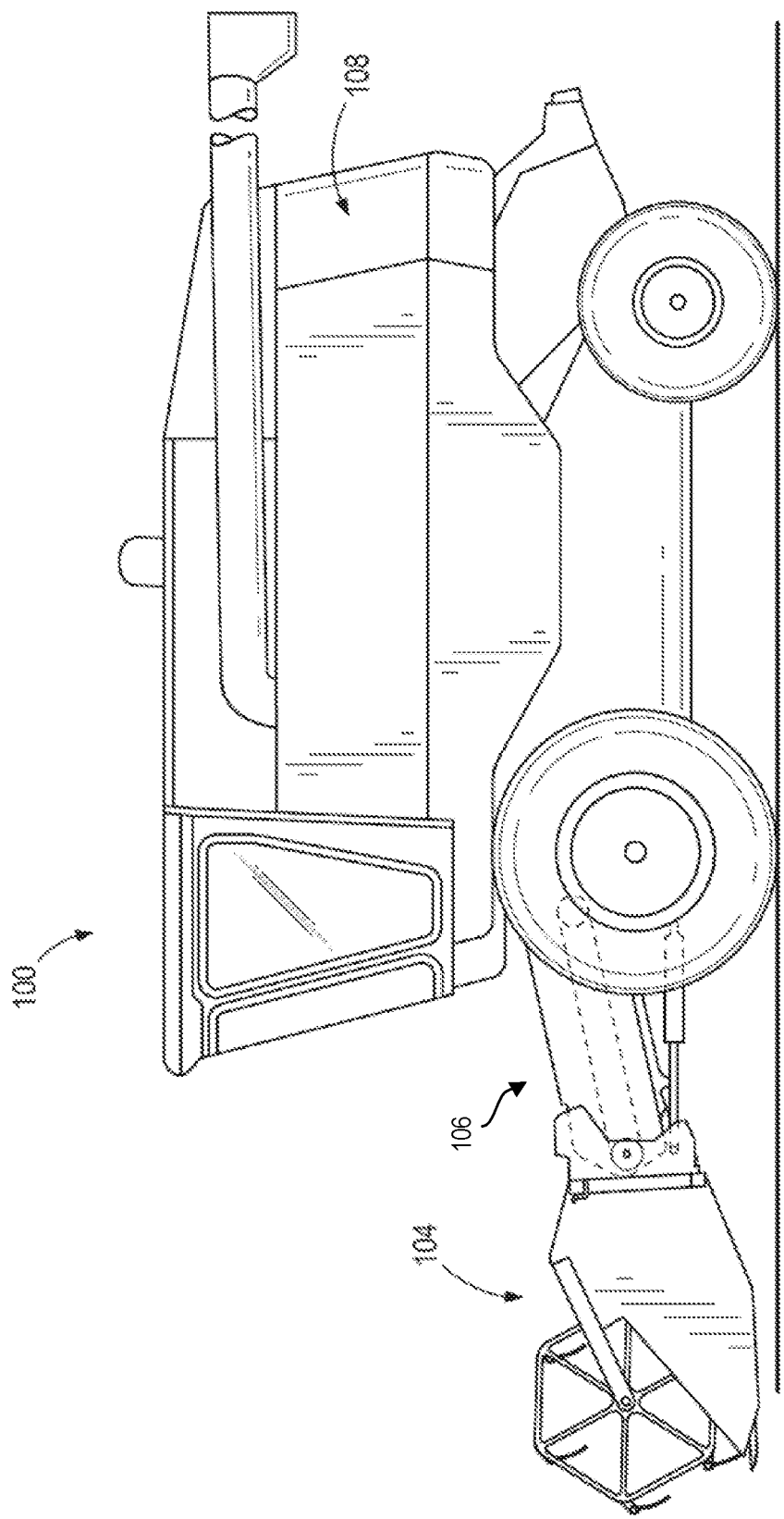
FIG. 1 is an elevation view of a combine harvester according to one embodiment.

FIG. 1 illustrates an example of a combine harvester 100 configured to gather (i.e., "reap") crops including, for example, wheat, oats, rye, barley, and corn. The combine harvester 100 is also configured to separate the grain from other material (e.g., straw). The combine harvester 100 includes a header 104 configured to gather and cut the crop and a feeder house 106 configured to transport the cut crop from the header 104 to separating systems housed in a main body 108 of the combine harvester 100.

Figure 2:
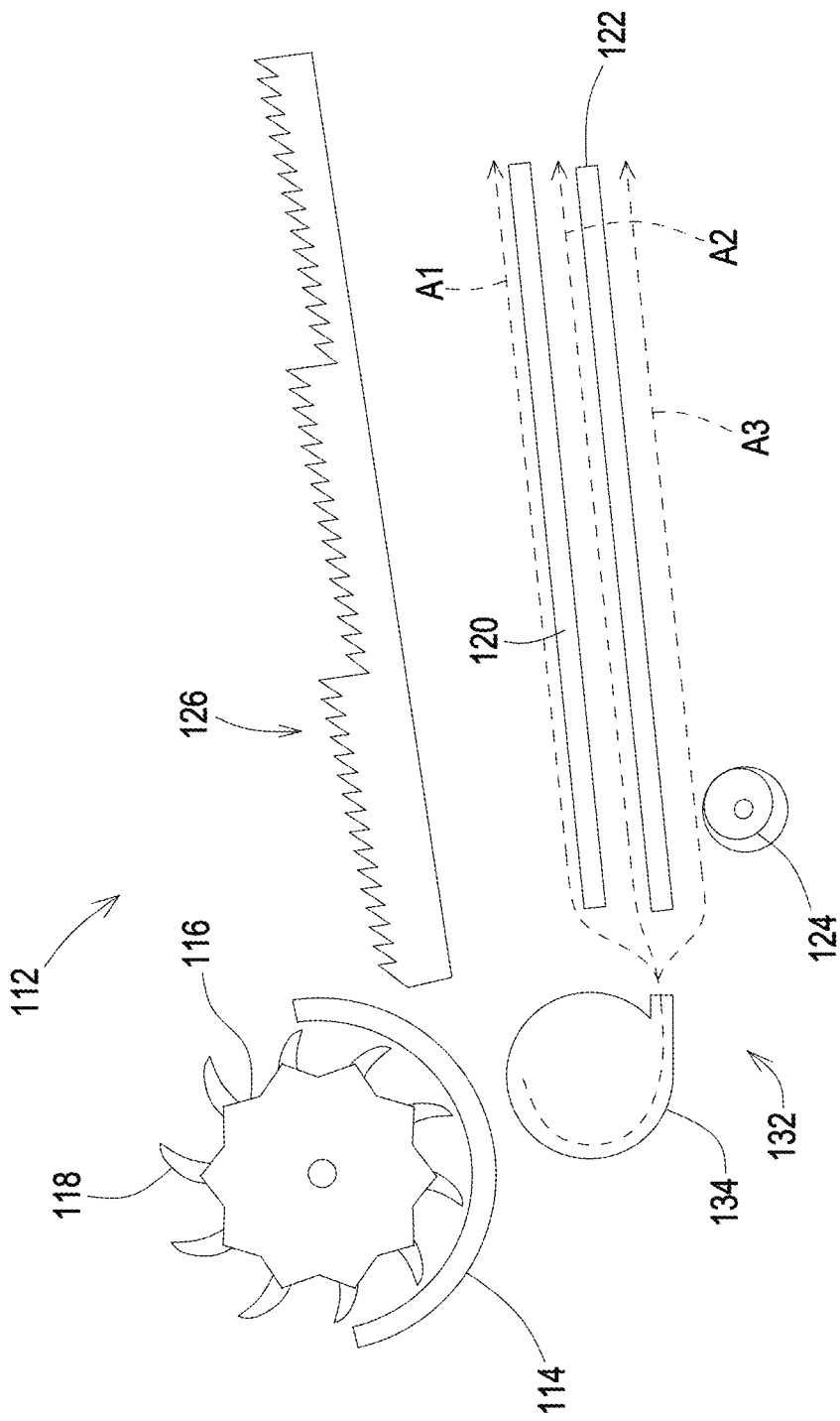
FIG. 2 is a schematic view of systems for separating grain from other material in the combine harvester of FIG. 1.

FIG. 2 illustrates an example of the separating systems 112 in the combine harvester 100. A threshing cylinder 116 includes rasp bars 118 that separate grain and chaff from straw. The majority of the straw passes from the threshing cylinder 116 to a straw walker 126 configured to move the straw towards the rear of the combine harvester 100 where it is expelled. The grain, chaff, and some straw that is separated from the rest of the crop by the threshing cylinder 116 passes through openings in a concave 114 and to a cleaning shoe 132. The cleaning shoe 132 includes an upper sieve 120 (or chaffer) and a lower sieve 122. The sieves 120, 122 include adjustable fingers that permit material below a certain size, such as grain, to fall through. Grain that falls through the sieves 120, 122 enters a collection area where the grain is then transported to the grain tank by an auger 124. Material other than grain (e.g., straw) is too large to fall to the collection area through the openings in the sieves 120, 122 and instead is carried off the rear of the sieves 120, 122 by airflow A1, A2 from a fan 134 and/or via a rhythmic, repetitive oscillating motion of the sieves 120, 122.

However, grain can be lost during the separation process illustrated in FIG. 2. For example, some of the grain might not fall through the sieves 120, 122 in the cleaning shoe and will instead be carried to the rear and expelled with the straw, etc. This can occur, for example, when the sieves 120, 122 become obstructed due to high humidity or when collecting high moisture/green crops. Grain loss can also be caused, for example, when the cleaning shoe is overloaded, when the angles of the sieves 120, 122 are inadequate, when the openings of the sieves 120, 122 are too small, or when the airspeed of the fan 134 is too high. Grain loss that occurs at the cleaning shoe 132 is referred to herein as "cleaning shoe grain loss."

Grain loss can also occur at other stages of the combine harvester 100. For example, "separation loss" can occur when grains are expelled by the thresher 116 to the straw walker 126 instead of passing through the concave 114 to the cleaning shoe 132. In the case of corn harvesting, separation loss can include whole cobs or small pieces of cob with kernels still attached and can occur, for example, when the spacing between the concave 114 and the threshing cylinder 116 is too small for the size of the cobs that are being harvested. Separation loss can also occur, for example, (1) when the rotor is running too slowly and, therefore, cannot separate grain from trash, (2) when an excessive amount of waste material is being collected by the harvester header 104, and (3) when the spacing of the concave 114 is too wide. Grain losses that occur after material exits the feeder house and before the material enters the cleaning shoe is referred to herein as "separation loss."

One approach to measuring grain loss is to utilize a physical sensor. For example, a physical grain loss sensor may be configured to detect kernels impacting a surface of a measuring device by detecting contact (e.g., a capacitive or piezoelectric sensor) or by detecting the sound of kernels striking a surface. However, various examples described further below provide a machine-learning or artificial intelligence mechanism that is configured to operate as a "virtual sensor" for estimating an amount of grain loss.

Figure 3:
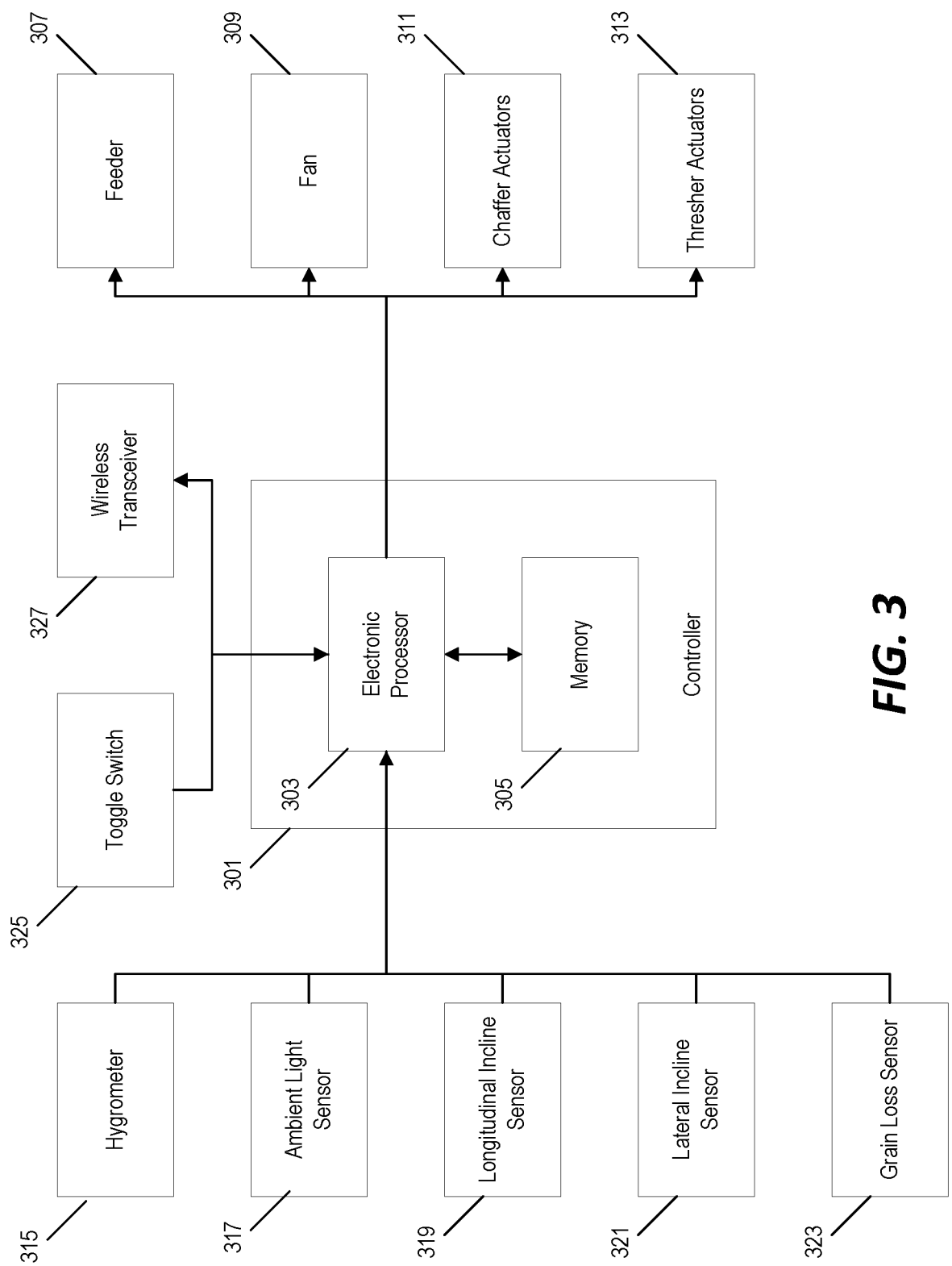
FIG. 3 is a block diagram of a control system for the combine harvester of FIG. 1.

FIG. 3 illustrates an example of a control system for a combine harvester 100 configured to apply an artificial neural network mechanism to estimate grain loss. The system includes a controller 301 that includes an electronic processor 303 and a non-transitory, computer-readable memory 305. The memory 305 stores data and instructions that, when executed by the electronic processor 303, provide the functionality of the controller 301 (including, for example, the functionality described herein).

The controller 301 is communicatively coupled to a plurality of actuators and is configured to provide control signals to the actuators to regulate the operation of the combine harvester 100. For example, the controller 301 is communicatively coupled to one or more actuators of the feeder 307 that control the speed at which crop material is fed through the feeder house 106 to the separating mechanisms 112. The controller 301 is also configured to provide control signals to the fan 309 to regulate the operating speed of the fan 309, to the chaffer actuators 311 to adjust the opening size of the sieves 120, 122, and to the thresher actuators 313 to adjust a rotational speed of the thresher cylinder 116 and/or a spacing between the thresher cylinder 116 and the concave 114.

In the example of FIG. 3, the controller 301 is also communicatively coupled to a plurality of sensors that provide the controller 301 with feedback and/or other information regarding the operating conditions of the combine harvester 100. For example, the controller 301 is coupled to a hygrometer 315 configured to provide a signal to the controller 301 indicative of a measured humidity and to an ambient light sensor 317 configured to measure an amount of ambient light. The controller 301 may also be coupled to incline sensors 319, 321 configured to provide information to the controller 301 regarding lateral and longitudinal inclination of a field surface on which the combine harvester 100 is operating. The controller 301 is also communicatively coupled to a physical grain loss sensor 323 configured to provide an output signal indicative of a measured amount of grain loss to the controller 301.

In the example of FIG. 3, the controller 301 is also communicatively coupled to a toggle switch 325 and/or other user input controls and a wireless transceiver 327 for communicating with remote computer systems. In various different implementations, the controller 301 may be configured to communicate with other sensors or actuators in addition to or instead of the sensors and actuators illustrated in the example of FIG. 3. Furthermore, in various different implementations, the controller 301 may be configured to communicate with the sensors and actuators through a wired communication interface, a wireless communication interface, or combinations of wired and wireless interfaces.

Figure 4:
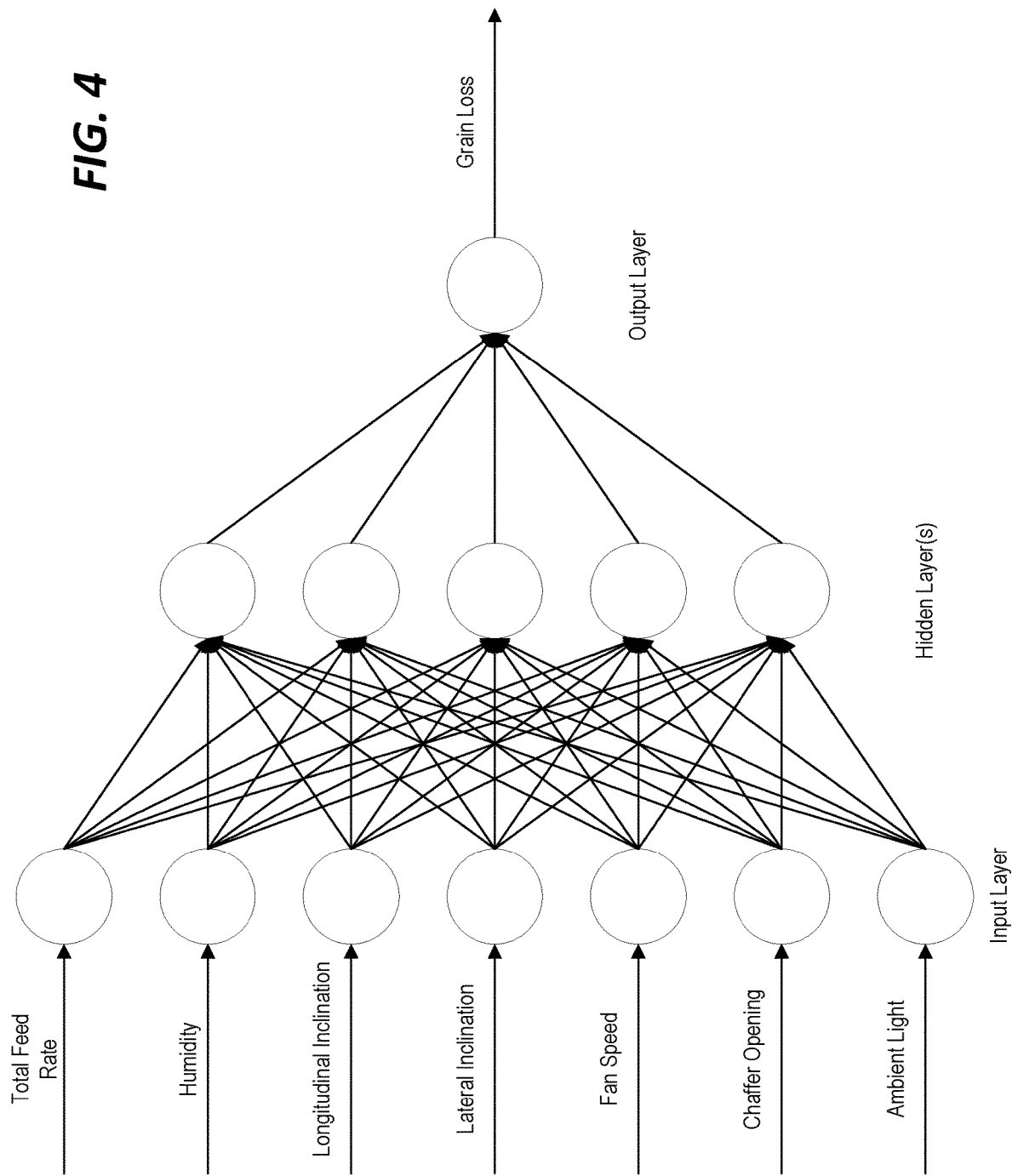
FIG. 4 is a schematic diagram of an artificial neural network for determining an amount of grain loss in the combine harvester of FIG. 1.

FIG. 4 illustrates an example of an artificial neural network (ANN) designed to estimate/predict grain losses based on machine settings, configurations, and operating inputs. In the specific example of FIG. 4, the artificial neural network receives as inputs a total feed rate (e.g., based on the current operating setting of the feeder 307), a humidity (based on the output of the hygrometer 315), a longitudinal inclination (based on the output of the longitudinal incline sensor 319), a lateral inclination (based on the output of the lateral incline sensor 321), a fan speed (based on the current operating setting of the fan 309), a chaffer opening size (based on the current operating setting of the chaffer actuator(s) 311), and a measurement of ambient light (based on the output of the ambient light sensor 317). The artificial neural network of FIG. 4 is trained to produce an estimated amount of grain loss (e.g., as a rate of grain loss) based on these inputs. Through continued retraining of the artificial neural network, the system will be able to better identify inputs that contribute to grain loss. Accordingly, in various different implementations, the artificially neural network may be configured to receive more inputs, fewer inputs, or other inputs in addition to or instead of the inputs listed in the example of FIG. 4.

Figure 5:
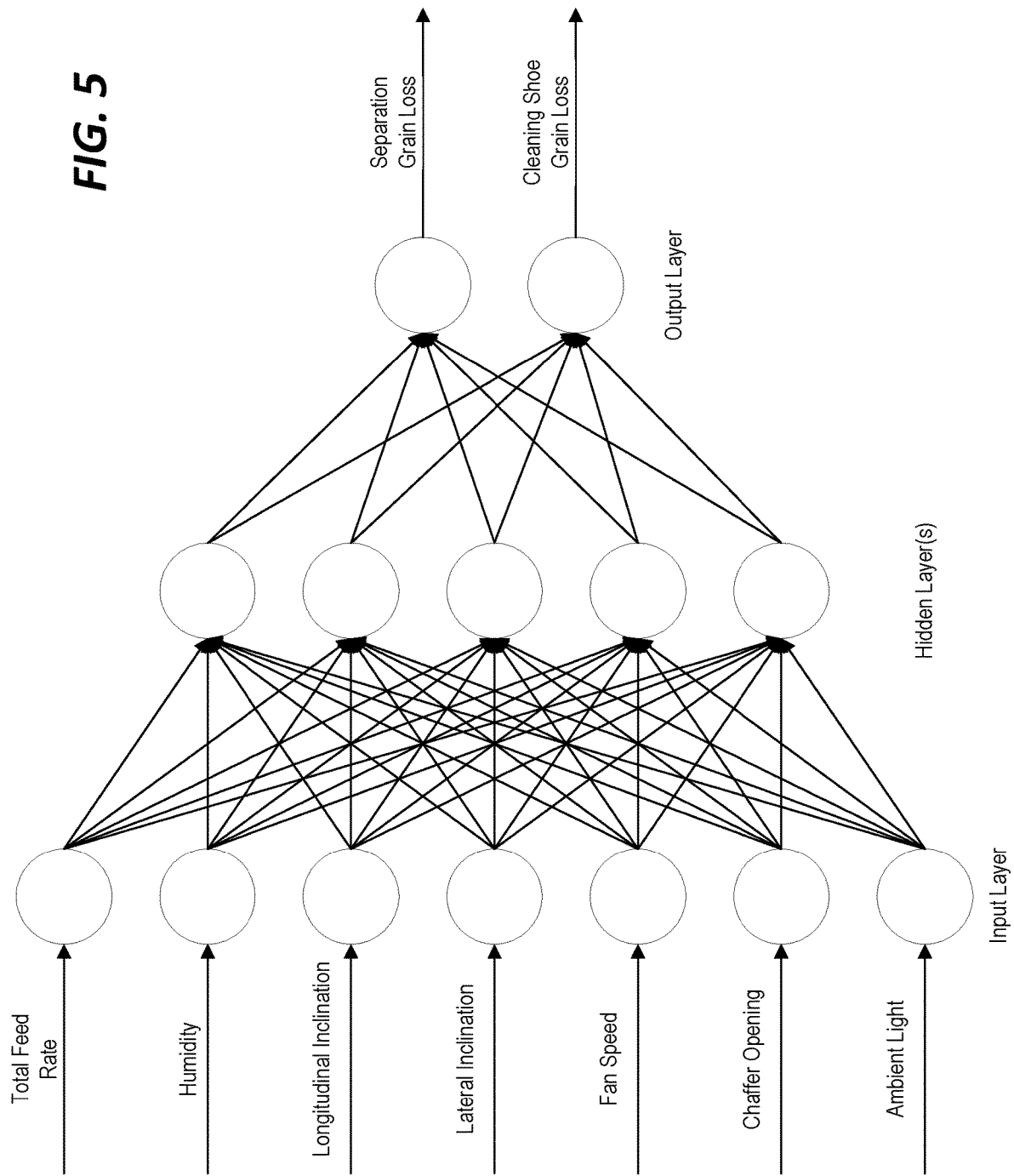
FIG. 5 is a schematic diagram of an artificial neural network for separately determining grain loss due to separation loss and due to cleaning shoe loss in the combine harvester of FIG. 1.

The example of FIG. 4 is configured to produce a single output indicative of "grain loss." Accordingly, in some implementations, a single artificial neural network may be implemented to produce an estimate of total grain loss. However, in other implementations, one or more artificial neural networks may be trained to estimate a particular type of grain loss. For example, a controller 301 may be configured to use an artificial neural network that is trained to estimate only separation loss. In another example, the controller 301 may be configured to use multiple different artificial neural networks where one artificial neural network is trained to estimate separation loss and another artificial neural network is trained to estimate cleaning shoe loss. In still other implementations, the controller 301 may be configured to apply an artificial neural network that is trained to produce multiple output each indicative of a different type of grain loss. For example, FIG. 5 illustrates an artificial neural network that is configured to receive the same inputs as the artificial neural network of FIG. 4, but is trained to produce two outputs: an estimation of separation grain loss and an estimation of cleaning shoe grain loss. Other implementations may be configured to use artificial neural networks that are trained to estimate different types of grain loss includes, for example, preharvest losses, header losses, and leakage losses.

The artificial neural networks illustrates in the examples of FIGS. 4 and 5 receive as inputs a variety of sensor and actuator values. However, they do not receive as an input a measured amount of grain loss from the grain loss sensor 323. Accordingly, the controller 301 may be configured to use the artificial neural network mechanism as a redundancy (to detect inconsistencies or problems of the hardware sensors) or as a simplex grain loss sensor (to provide an alternative mechanism for measuring grain loss). In some implementations, the combine harvester 100 may be configured to not include any physical grain loss sensor 323 and to instead use the artificial neural network mechanism as the sole method for estimating/measuring grain loss.

Figure 6:
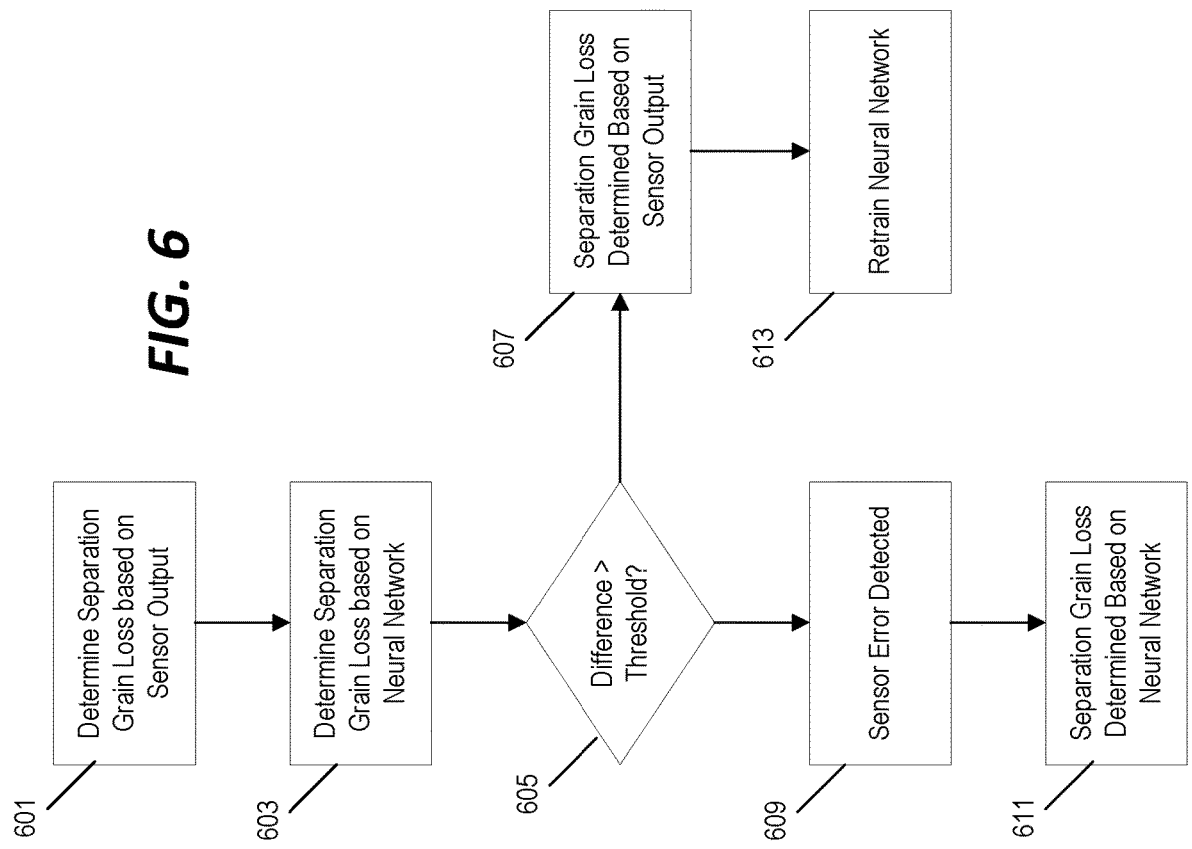
FIG. 6 is a flowchart of a method for determining grain loss in the combine harvester of FIG. 1 using the artificial neural network as a redundancy mechanism.

FIG. 6 illustrates an example of a method for using the artificial neural network as a redundancy to confirm proper operation of the physical grain loss sensor 323 (e.g., a physical grain loss sensor configured to detect separation loss). The controller 301 receives an output signal from the grain loss sensor 323 and determines, based on the sensor output, an amount of separation loss (step 601). The controller 301 also applies the artificial neural network (e.g., of FIG. 4) to determine an estimated amount of separation loss (step 603). The controller 301 compares the two determine grain loss values and, if the difference is within a defined tolerance threshold (step 605), the controller 301 determines that the physical grain loss sensor 323 is operating properly and defines separation loss based on the sensor output (step 607). However, if the difference is greater than the tolerance threshold, then the controller 301 determines that there is an error in the output from the physical grain loss sensor 323 (step 609) and defines separation loss based on the output of the artificial neural network (i.e., the "virtual sensor") (step 611).

In some implementations, the controller 301 is configured to update and retrain the artificial neural network based on the set of inputs and a defined output as determined by the physical grain loss sensor 323. For example, in the method of FIG. 6, the controller 301 is configured to retrain the artificial neural network in response to determining that the physical grain loss sensor 323 is operating properly (step 613). This can be implemented, for example, by using "supervised learning" in which the output of the physical grain loss sensor 323 is provided as the defined "output" corresponding to the current set of "inputs." In some implementations, the controller 301 may be configured to perform this retraining operation locally while, in other implementations, the set of inputs and the defined "output" are transferred to a remote computer system (e.g., via the wireless transceiver 327) which retrains the artificial neural network and transmits an updated artificial neural network back to the controller 301 for future use. In some implementations, the artificial neural network is retrained based only on data from a single combine harvester 100 while, in other implementations, the artificial neural network is configured to aggregate data from multiple different combine harvesters to retrain the artificial neural network. For example, the artificial neural network might be retrained based on data from multiple combine harvesters in a fleet.

In the example of FIG. 6, in response to determining that the physical grain loss sensor 323 is operating properly, the separation loss is defined based on the output of the physical grain loss sensor 323 (step 607). In some implementations, the controller 301 may be configured to do this by simply defining separation loss as equal to the output of the grain loss sensor 323. However, in other implementations, the controller 301 may be configured to determine an amount of grain loss based on both the output of the physical grain loss sensor 323 and the output of the artificial neural network-based "virtual sensor." For example, the controller 301 might be configured to define the separation loss as an average of the output from the physical grain loss sensor 323 and the output from the virtual sensor.

The example of FIG. 6 requires both the "virtual sensor" and a physical grain loss sensor 323 as a redundant mechanism for measuring grain loss. However, in other implementations, the physical grain loss sensor 323 can be omitted entirely and replaced with the virtual sensor. For example, the controller 301 may be configured to define total grain loss, separation loss, and/or cleaning shoe loss based on the output of one or more artificial neural networks. Accordingly, the cost of the combine harvester 100 can be reduced by replacing the physical grain loss sensor 323 with the virtual sensor.

Figure 7:
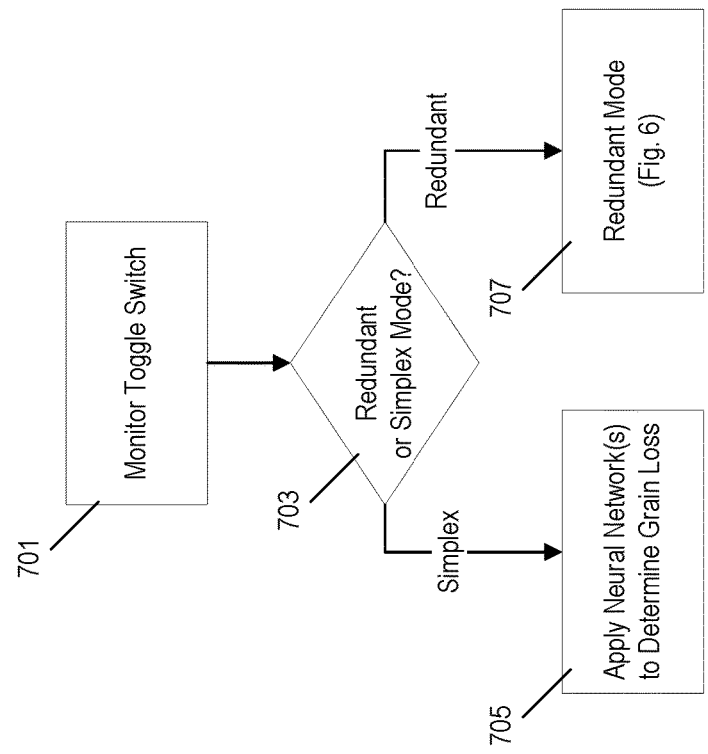
FIG. 7 is a flowchart of a method for determining grain loss in the combine harvester of FIG. 1 by selectively using the artificial neural network as a redundancy mechanism or as a simplex mechanism.

Similarly, in some implementations, the system can be configured to allow an operator to manually select whether to use the virtual sensor as a redundancy to the physical grain loss sensor or to use only the virtual sensor as a "simplex" mechanism for determining grain loss. FIG. 7 illustrates an example of one such method. The controller 301 monitors the state of a user input control (e.g., toggle switch 325) (step 701) to determine whether the operator has selected a "redundant mode" or a "simplex mode" (step 703). If the operator has selected the "simplex mode" (i.e., by moving the toggle switch into a first position), the controller 301 applies the artificial neural network to determine grain loss using the "virtual sensor" (step 705). Conversely, if the operator has selected the "redundant mode" (i.e., by moving the toggle switch into a second position), the controller 301 applies a method like the one illustrated in FIG. 6 to use the output of the "virtual sensor" as a redundancy of the output of the physical grain loss sensor (step 707).

Accordingly, the invention provides, among other things, systems and methods for a virtual grain loss sensor using an artificial neural network configured to estimate grain loss based on machine operating settings and/or other sensor outputs. Various features and advantages of the invention are set forth in the following claims.

What is claimed is:

1. A method for determining an amount of grain loss during operation of a combine harvester, the method comprising:
   determining, by an electronic processor, values for a set of operating parameters, the set of operating parameters not including any direct measurement of grain loss; and
   applying, by the electronic processor, an artificial neural network trained to receive as inputs the set of operating parameters and to produce as an output a value indicative of an estimated amount of grain loss;
   receiving, by the electronic processor, an output from a physical grain loss sensor indicative of an amount of grain loss measured by the physical grain loss sensor;
   determining, by the electronic processor, a difference in the amount of grain loss measured by the physical grain loss sensor and the estimated amount of grain loss based on a comparison of the output from the physical grain loss sensor and the output of the artificial neural network;
   confirming, by the electronic processor, proper operation of the physical grain loss sensor based at least in part on the difference; and
   while a toggle switch is in a first position and proper operation of the physical grain loss sensor is confirmed, defining, by the electronic processor, an amount of grain loss during operation of the combine harvester based on the output of the physical grain loss sensor,
   while the toggle switch is in the first position and it is determined, based on the comparison, that the physical grain loss sensor is not operating properly, defining, by the electronic processor, the amount of grain loss during operation of the combine harvester based on the output of the artificial neural network, and
   in response to determining that the toggle switch is in a second position, defining the amount of grain loss during operation of the combine harvester with the set of operating parameters based on the output of the artificial neural network,
   wherein the amount of grain loss during operation is related to the values for the set of operating parameters.

2. The method of claim 1, wherein determining the values for the set of operating parameters includes
   determining at least one sensor value based on an output received by the electronic processor from a sensor indicative of a condition measured by the sensor, and
   determining at least one actuator setting, wherein the electronic processor is configured to control the combine harvester by applying the at least one actuator setting to an actuator of the combine harvester.

3. The method of claim 1, wherein determining the values for the set of operating parameters includes determining values of
   a total feed rate of the combine harvester,
   a humidity, a longitudinal inclination,
a lateral inclination,
a speed of a fan configured to blow an airstream over at least one sieve of a cleaning shoe of the combine harvester,
a chaffer opening size of the cleaning shoe of the combine harvester, and
an amount of ambient light.

4. The method of claim 1, further comprising:
retraining the artificial neural network through supervised machine learning using the set of operating parameters as the input and the output of the physical grain loss sensor as a defined output of the artificial neural network.

5. The method of claim 1, further comprising adjusting, by the electronic processor, at least one actuator setting of the combine harvester based at least in part on the determined amount of grain loss.

6. The method of claim 1, wherein applying the artificial neural network includes applying a first artificial neural network trained to produce as an output a value indicative of an amount of separation loss, and further comprising applying a second artificial neural network trained to produce as an output a value indicative of an amount of cleaning shoe loss.

7. The method of claim 6, wherein the second artificial neural network is configured to receive as inputs a second set of operating parameters, and wherein the second set of operating parameters is different than the set of operating parameters received as the inputs by the first artificial neural network.

8. The method of claim 6, wherein the set of operating parameters received as inputs by the second artificial neural network is the same as the set of operating parameters received as inputs by the first artificial neural network.

9. A system configured to apply a virtual sensor to determine an amount of grain loss during operation of a combine harvester, the system comprising:
a plurality of actuators;
a physical grain loss sensor configured to directly measure an amount of grain loss and to output a signal indicative of the measured amount of grain loss;
a toggle switch selectively positionable in a first position and a second position,
a plurality of sensors; and
an electronic controller configured to
apply an actuator setting to each actuator of the plurality of actuators to control operation of the combine harvester,
receive output signals from each sensor of the plurality of sensors, wherein the output signal from each sensor is indicative of a different operating condition of the combine harvester,
determine values for a set of operating parameters, the set of operating parameters not including any direct measurement of grain loss,
applying an artificial neural network trained to receive as inputs the set of operating parameters and to produce as an output a value indicative of an amount of grain loss,
receive the output from the physical grain loss sensor,
determine a difference in the amount of grain loss measured by the physical grain loss sensor and the estimated amount of grain loss based on a comparison of the output from the physical grain loss sensor and the output of the artificial neural network, confirm proper operation of the physical grain loss sensor based at least in part on the difference,
while the toggle switch is in the first position and proper operation of the physical grain loss sensor is confirmed, define an amount of grain loss during operation of the combine harvester based on the output of the physical grain loss sensor,
define the amount of grain loss based on the output of the artificial neural network when the toggle switch is in the first position in response to determining that the physical grain loss sensor is not operating properly based on the comparison of the output of the physical grain loss sensor and the output of the artificial neural network, and
in response to determining that the toggle switch is in the second position, define the amount of grain loss during operation of the combine harvester with the set of operating parameters based on the output of the artificial neural network,
wherein the amount of grain loss during operation of the combine harvester is related to the values for the set of operating parameters.

10. The system of claim 9, wherein the set of operating parameters includes at least one selected from a group consisting of
a total feed rate of the combine harvester, a measured humidity,
a longitudinal inclination,
a lateral inclination,
a speed of a fan configured to blow an airstream over at least one sieve of a cleaning shoe of the combine harvester,
a chaffer opening size of the cleaning shoe of the combine harvester,
and an amount of ambient light.

11. The system of claim 9, wherein the electronic processor is further configured to
retrain the artificial neural network through supervised machine learning using the set of operating parameters as the input and the output of the physical grain loss sensor as a defined output of the artificial neural network.

12. The system of claim 9, wherein the electronic processor is further configured to adjust at least one actuator setting of the combine harvester based at least in part on the determined amount of grain loss.

13. The system of claim 9, wherein the electronic processor is configured to apply the artificial neural network by applying a first artificial neural network trained to produce as an output a value indicative of an amount of separation loss, and wherein the electronic processor is further configured to apply a second artificial neural network trained to produce as an output a value indicative of an amount of cleaning shoe loss.

14. The system of claim 13, wherein the second artificial neural network is configured to receive as inputs a second set of operating parameters, and wherein the second set of operating parameters is different than the set of operating parameters received as the inputs by the first artificial neural network.

15. The system of claim 13, wherein the set of operating parameters received as inputs by the second artificial neural network is the same as the set of operating parameters received as inputs by the first artificial neural network.

* * * * *